US012171353B2

(12) United States Patent
Mainetti

(10) Patent No.: US 12,171,353 B2
(45) Date of Patent: Dec. 24, 2024

(54) METHOD FOR PRODUCING HANGERS AND SIMILAR DEVICES FOR CLOTHING SUPPORT, COMPRISING AT LEAST ONE CONCAVE AREA, STARTING FROM A FLAT LAYER OF PAPER MATERIAL

(71) Applicant: MAINETTI S.P.A., Vicenza (IT)

(72) Inventor: Mario Mainetti, Vicenza (IT)

(73) Assignee: MAINETTI S.P.A., Vicenza (IT)

( * ) Notice: Subject to any disclaimer, the term of this patent is extended or adjusted under 35 U.S.C. 154(b) by 0 days.

(21) Appl. No.: 17/920,891

(22) PCT Filed: May 6, 2021

(86) PCT No.: PCT/EP2021/062059

§ 371 (c)(1),
(2) Date: Oct. 24, 2022

(87) PCT Pub. No.: WO2021/228693

PCT Pub. Date: Nov. 18, 2021

(65) Prior Publication Data

US 2023/0157470 A1 May 25, 2023

(30) Foreign Application Priority Data

May 11, 2020 (IT) ........................ 102020000010495

(51) Int. Cl.
*A47G 25/36* (2006.01)
*B31D 5/02* (2017.01)

(52) U.S. Cl.
CPC ............... *A47G 25/36* (2013.01); *B31D 5/02* (2013.01)

(58) Field of Classification Search
CPC .................................. A47G 25/36; B31D 5/02
See application file for complete search history.

(56) References Cited

U.S. PATENT DOCUMENTS

| | | | | |
|---|---|---|---|---|
| 7,841,495 | B2 * | 11/2010 | Gouldson | A47G 25/1428 40/322 |
| 2010/0213222 | A1 * | 8/2010 | Boyko | A47G 25/28 223/85 |
| 2012/0118921 | A1 | 5/2012 | Mackenzie | |

FOREIGN PATENT DOCUMENTS

| | | | | |
|---|---|---|---|---|
| DE | 102010011772 A1 * | 9/2011 | B31B 43/00 |
| JP | H0714978 U | 3/1995 | |
| JP | H08164053 A * | 6/1996 | |
| JP | 3027974 U * | 8/1996 | |
| JP | 3030091 U * | 10/1996 | |
| JP | H0937921 | 2/1997 | |

(Continued)

*Primary Examiner* — Shaun R Hurley
(74) *Attorney, Agent, or Firm* — DUANE MORRIS LLP; Gregory M. Lefkowitz; Joaquin Hernandez

(57) ABSTRACT

Method and apparatus for producing hangers and similar devices. In some examples, a method includes wetting a flat layer of paper material to increase humidity percentage at room temperature; leaving said layer of paper material to rest for a predetermined period of time; cutting said flat layer of paper material to define an appropriate shape for the hanger; carrying out a knurling operation on at least one portion of the flat layer of paper material so that at least one concave area is realized; forming the flat layer of paper material by introducing the flat layer of paper material between a mould and a counter-mould and subsequently through pressing; and carrying out a stabilisation operation of the hanger to reduce the humidity percentage.

14 Claims, 5 Drawing Sheets

(56) References Cited

FOREIGN PATENT DOCUMENTS

| | | | | |
|---|---|---|---|---|
| JP | H09215580 | | | 8/1997 |
| JP | H09276116 | A | * | 10/1997 |
| JP | 2003169998 | A | * | 6/2003 |

* cited by examiner

METHOD FOR PRODUCING HANGERS AND SIMILAR DEVICES FOR CLOTHING SUPPORT, COMPRISING AT LEAST ONE CONCAVE AREA, STARTING FROM A FLAT LAYER OF PAPER MATERIAL

CROSS-REFERENCE TO RELATED APPLICATIONS

This application is a § 371 national stage entry of International Application No. PCT/EP2021/062059, filed May 6, 2021, which claims priority to Italian Patent Application No. 102020000010495, filed May 11, 2020, the entire contents of which are incorporated herein by reference.

The invention concerns a method for producing hangers and similar devices for clothing support, comprising at least one concave area, starting from a flat layer of paper material. With the term similar devices is meant any object for hanging, displaying to the public and transporting clothing and accessories thereof.

The invention also relates to hangers and similar devices for clothing support comprising at least one concave area obtained with the aforesaid method.

Furthermore, the invention relates to a system configured for carrying out the aforesaid method.

As known with the constant rise of environmental awareness on a global level there is an increasing need to replace, in many sectors, objects made of plastic material, with equivalent objects made with materials of natural origin, in particular of vegetable origin, that are ecological and biodegradable.

A known solution to this need is the use of the so-called "cellulose pulp", which is a totally natural product, the main component of which is wood, consisting of 45% cellulose, 30% hemicellulose, 23% of lignin and 5% of various extractables, including resins, terpenes and fatty acids.

Said cellulose pulp, which appears substantially as a wet pulp, is used in thermoforming processes to produce various objects, such as for example dishes, glasses or tableware in general, packaging elements, such as for example egg boxes, or such as shoe trees or shoe holders.

However, the use of said material to produce the aforesaid objects entails some important drawbacks in comparison to the use of plastic material to obtain the same object.

First of all, the cost of the "cellulose pulp" raw material is significantly higher than the cost of the compounds used to produce plastic objects.

The most important state of the art document is constituted by the document JPH0937921A which illustrates a method for producing hangers comprising at least one concave area starting from a flat layer of paper material and which provides for the following steps:

- cutting said flat layer of paper material so as to define an appropriate shape for the realization of said hanger;
- carrying out the forming of said cut flat layer of paper material by means of the introduction of said cut flat layer of paper material between a mould and a counter-mould and subsequently through pressing.

The following additional state of the art are also cited: JPH0714978U, JPH09215580A and WO2011/010091A2.

In all these processes described in the aforesaid documents, a further problem consists in the fact that the thickness of the objects to be operated on is limited by the operating capacity of the device suitable for removing the humidity of the cellulose pulp.

The present invention intends to overcome all the aforementioned drawbacks, present in particular in the devices and processes described in said documents.

Furthermore, a further drawback also concerns the production processes that use cellulose pulp to produce three-dimensional objects, since these processes are more complex and require longer times than the processes used to produce the same objects in plastic material.

In particular, the cellulose pulp during processing must be wetted and subsequently dried, which entails long processing times.

A further problem consists in the fact that the thickness of these objects is limited by the operating capacity of the device suitable for removing the humidity of the cellulose pulp. The present invention intends to overcome all the mentioned drawbacks.

More precisely, the present invention intends to propose an alternative method for producing hangers and similar devices for clothing support of ecological and biodegradable type, with respect to the methods that provide for the use of cellulose pulp. In particular, object of the invention is to propose a method for producing hangers and similar devices for clothing support that allows such elements to be produced in such a way that they are ecological and biodegradable, with costs entirely equivalent to those of the same product made in plastics.

Furthermore, object of the invention is to propose a method for producing hangers and similar devices for clothing support of ecological and biodegradable type, which provides for implementation times for producing an object, that is completely comparable to the methods used for producing the same objects in plastic material.

Said objects are achieved with the method for producing hangers and similar devices for clothing in accordance with the main claim.

Further characteristics of the method of the invention are described in the dependent claims.

The aforesaid objects are also achieved by the system for implementing the method of the invention, where the system includes a station for wetting said flat layer of paper material (200), a rest station for resting said flat layer of paper material (200), a cutting station provided with cutting matrices, knurling station provided with at least two toothed rollers, a forming press provided with a mould and a counter-mould to form a three-dimensional object, and a stabilisation station configured to reduce the humidity percentage of said three-dimensional object (100) following the forming operation.

Finally, the hangers obtained by means of said method and using said system are also claimed.

The aforesaid objects, together with the advantages that will be mentioned hereinafter, will be highlighted during the description of a preferred embodiment of the invention, which is given by way of non-limiting example with reference to the accompanying drawings, where:

FIG. 5 shows the cut and knurled flat layer of paper material from which the hanger of FIG. 2 is obtained;

Figure 1:
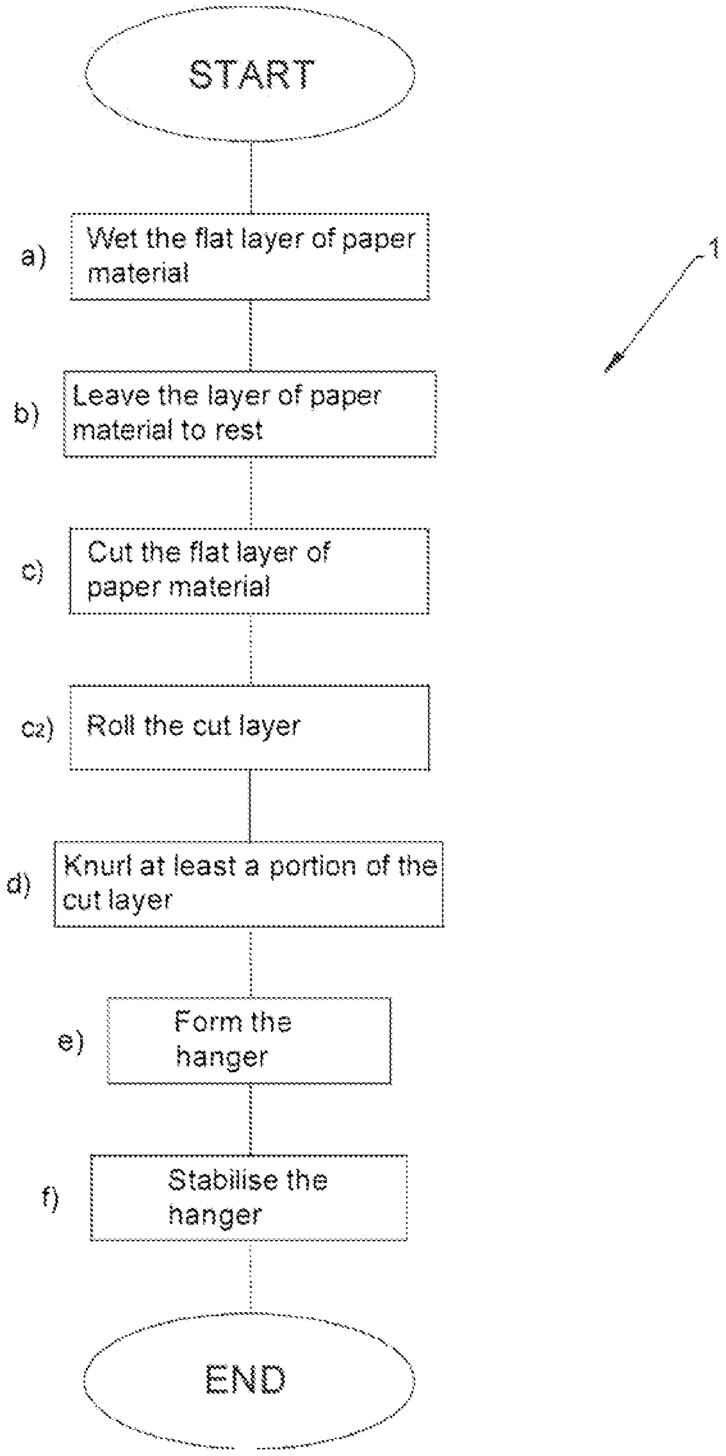
FIG. 1 shows the sequence of operations of the method of the invention according to a preferred embodiment.

The method in accordance with the invention for producing a hanger provided with at least one concave area, starting from a flat layer of paper material, is described below according to a preferred embodiment, and is indicated as a whole with the reference 1 in FIG. 1.

Figure 2:
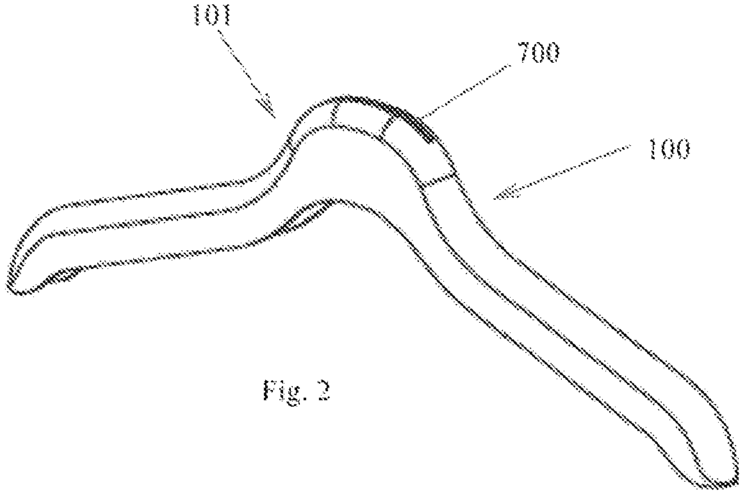
FIG. 2 shows an example of hanger obtained through the method of the invention.

Furthermore, said method according to the invention is described with reference to the hanger showed in FIG. 2 and indicated therein with the reference 100.

It is hereby specified that the hanger 100 shows an example of hanger obtainable with the method 1 of the invention and is proposed only for demonstration purposes.

However, it is evident that what is described below is applied in a similar way to a hanger of any shape, provided that it is provided with at least one concave area.

Figure 3:
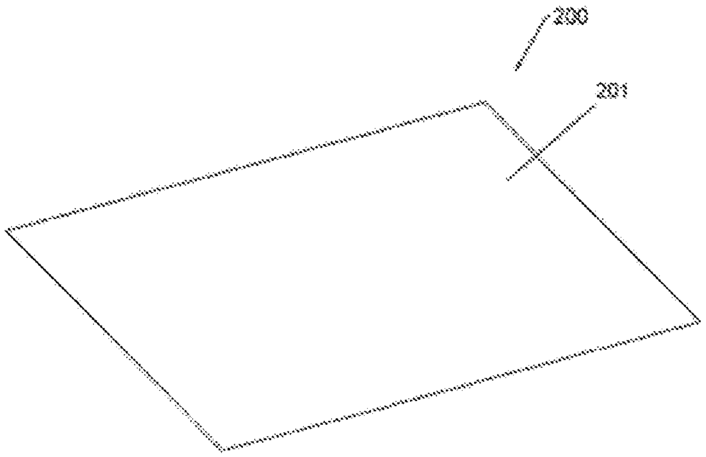
FIG. 3 shows a flat layer of paper material from which the hanger of FIG. 2 is obtained by implementing the method of the invention.

As regards the flat layer of paper material, indicated in FIG. 3 with the reference 200, it preferably has a thickness comprised between 0.5 mm and 4.5 mm, and is mainly composed of paper fibres recovered from recycling.

Returning to the preferred embodiment of the method 1 of the invention, it provides with carrying out a first step a) of wetting the aforesaid flat layer of paper material 200, preferably a flat layer of fibre cardboard 201, showed in FIG. 3, so as to increase the humidity percentage with respect to the standard humidity percentage that such flat layer of paper material 200 presents at room temperature.

Following this wetting step, the method provides with carrying out a step b) of leaving the flat layer of paper material 200 to rest for a predetermined period of time, so that the aforesaid humidity percentage is uniformly distributed throughout the entire thickness thereof.

In detail, according to the preferred embodiment of the invention, this humidity percentage to which the flat layer of paper material 200 is brought through steps a) and b) is comprised between 10% and 30%, preferably between 15% and 25%, even more preferably it is equal to 22%.

As regards the wetting step a), according to the preferred embodiment, it is carried out by applying onto at least one surface of said flat layer of paper material 200 a substance comprising water in the vaporized form. This substance could also comprise, in a lower percentage than the amount of water, softening compounds, e.g., soaps, waxes or emollients.

The presence of the aforesaid softening compounds allows softening the fibres, favouring their widening.

In an alternative embodiment, the aforesaid substance could be applied onto the flat layer of paper material 200 by rolling.

As regards the resting step b), according to the preferred embodiment of the invention, it provides with leaving the layer of paper material 200 to rest at room temperature for a period comprised between 12 hours and 36 hours, preferably for a period equal to 24 hours.

The execution of the two steps a) and b) described above advantageously allows making the flat layer of paper material 200 softer and more malleable than its natural characteristics, so as to facilitate the subsequent forming step.

Continuing with the steps of the method 1 of the invention, once the flat layer of paper material 200 has been left to rest, so as to present a humidity percentage higher than the standard one, uniformly throughout the entire thickness thereof, the same flat layer of paper material 200 is cut so as to define an appropriate shape for the realization of the hanger 100 which is intended to be obtained. As to the example taken into consideration, this shape of the flat layer of paper material 200 is showed in FIG. 4, where it is indicated with the reference 300.

Clearly, said appropriate shape depends on the hanger 100 which is intended to be obtained at the end of the process.

In fact, it is necessary to proceed during the development step with subsequent attempts in order to obtain the desired shape at the end of the process.

According to the preferred embodiment of the invention following the cutting step c), the method 1 of the invention provides with carrying out a rolling step c2) of this flat layer of paper material, in order to facilitate the opening of its fibres.

It is not excluded, however, that this step c2) in alternative embodiments to the preferred one is not provided.

Subsequent to step c) or step c2), the method 1 of the invention provides with carrying out a knurling step d) on at least one portion 301 (FIG. 5) of the cut flat layer of paper material 300 in which the aforesaid concave area 101 will be realized.

In particular, said knurling operation provides with making incisions at substantially parallel and not intersecting lines, indicated in FIG. 5 with reference 302, in the substantially orthogonal direction to the direction of the fold to be carried out.

These incisions 302 are preferably made by passing the portion 301 of the cut flat layer of paper material 300 between two toothed rollers.

Advantageously, the fact of making these incisions at substantially parallel and not intersecting lines 302, and then of partially and alternately thinning the portion 301 of the cut flat layer of paper material 300 at the area 101 which will be made concave, allows, once forming has been carried out, to keep the thickness of the same object 100 at this area 101, almost uniform and regular, thus avoiding wrinkles and non-uniformities which could structurally weaken the object 100, in any case making it unsightly.

Subsequently, the step e) provides with giving shape to the cut flat layer of paper material 300 by means of the introduction of the same cut flat layer of paper material 300 between a mould 400 and a counter-mould 500 (FIGS. 11-14) and, subsequently, through pressing.

Figure 14:
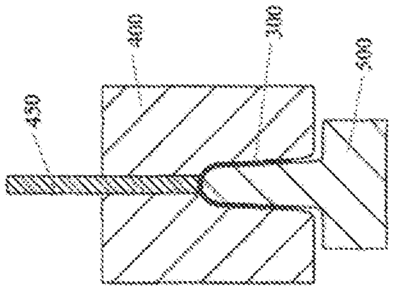
FIGS. 12-14 show three deformation steps of said layer according to the invention.
Figure 13:
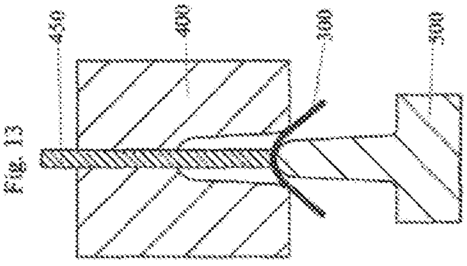
Figure 12:
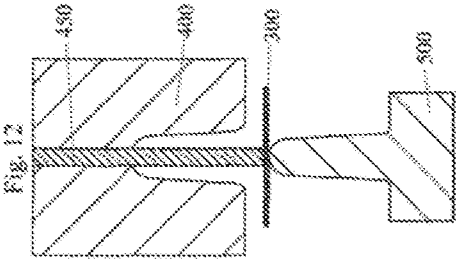
Figure 16:
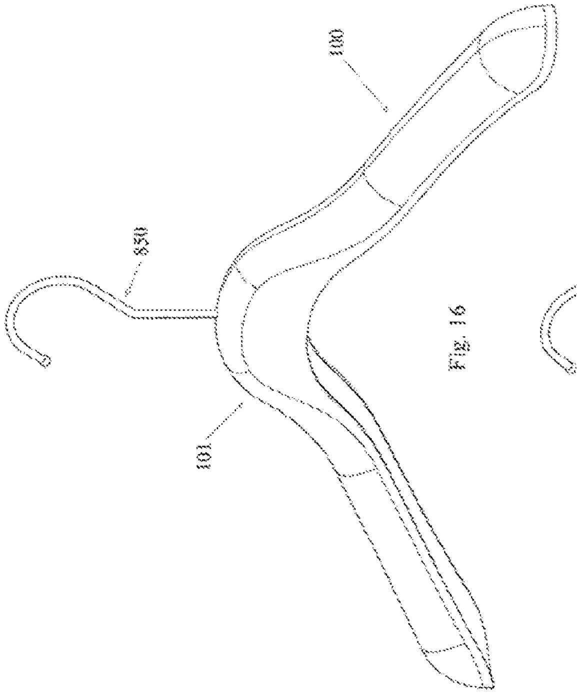
FIGS. 15-18 show, respectively, a front, perspective, in vertical section and in exploded perspective view of a hanger produced according to the method of the invention, which has a hook of the traditional type.
Figure 18:
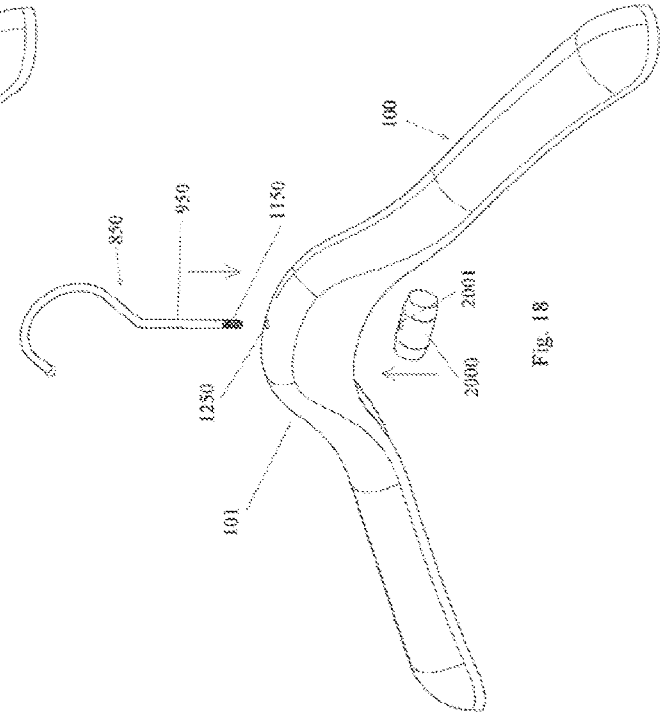
Figure 15:
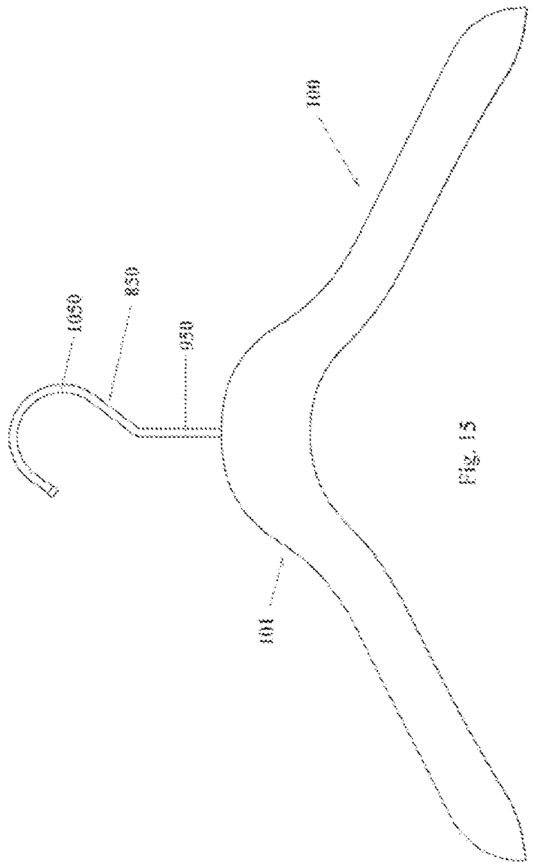

As can be seen in these last four figures, according to the invention, the flat layer 300 will advantageously be withheld during the forming step by at least one catch 450, integral with the mould 400, so that it adheres firmly to the opposite surface of the counter-mould 500, thus causing, as visible in the sequence of FIGS. 12-14, that the flat layer 300 changes its shape in the desired manner while maintaining its position fixed with respect to the counter-mould 500. It should be noted that in an alternative embodiment the at least one catch 450 may also be integral with the counter-mould 500 so that the flat layer 300 during the forming step adheres firmly to the opposite surface of the mould 400.

According to the preferred embodiment of the invention, this forming step e) is a hot forming.

In particular, the mould and the counter-mould are heated so as to have a temperature comprised between 60° C. and 120° C., preferably between 80° C. and 100° C., even more preferably at 90° C. during pressing.

Finally, the method 1 of the invention provides with carrying out a stabilisation step f) of the formed hanger 100, reducing the humidity percentage thereof.

In particular, according to the preferred embodiment of the invention, this stabilisation step f) provides with introducing the hanger 100 into a tunnel in which cold air circulates and with a humidity level less than 13%.

The cold air is advantageously made to flow over the entire surface of the hanger 100, in particular, within the aforesaid concave area 101, so as to rapidly lower the humidity level of the hanger 100 and therefore to stabilise the shape thereof.

It is not excluded, however, that this stabilisation step can be obtained by means of hot air.

As previously stated, the hanger 100 obtained with the method 1 of the invention also forms part of the invention.

Furthermore, the system for producing a hanger 100 provided with at least one concave area 101, starting from a flat layer of paper material 200, is also part of the invention, where said system comprises:

- a station for wetting the flat layer of paper material 200 so as to carry out step a) of the method according to the invention;
- a rest station for resting the flat layer of paper material 200;
- a cutting station provided with cutting matrices configured to carry out step c) of the method of the invention;
- a knurling station provided with at least two toothed rollers configured to carry out step d) of the method of the invention;
- a forming press provided with a mould and a counter-mould, where said press is configured to carry out step e) of the method of the invention;
- a stabilisation station configured to decrease the humidity percentage of the hanger 100 following the forming operation.

Figures 3, 4, 6, 7, 8, 9, 10:
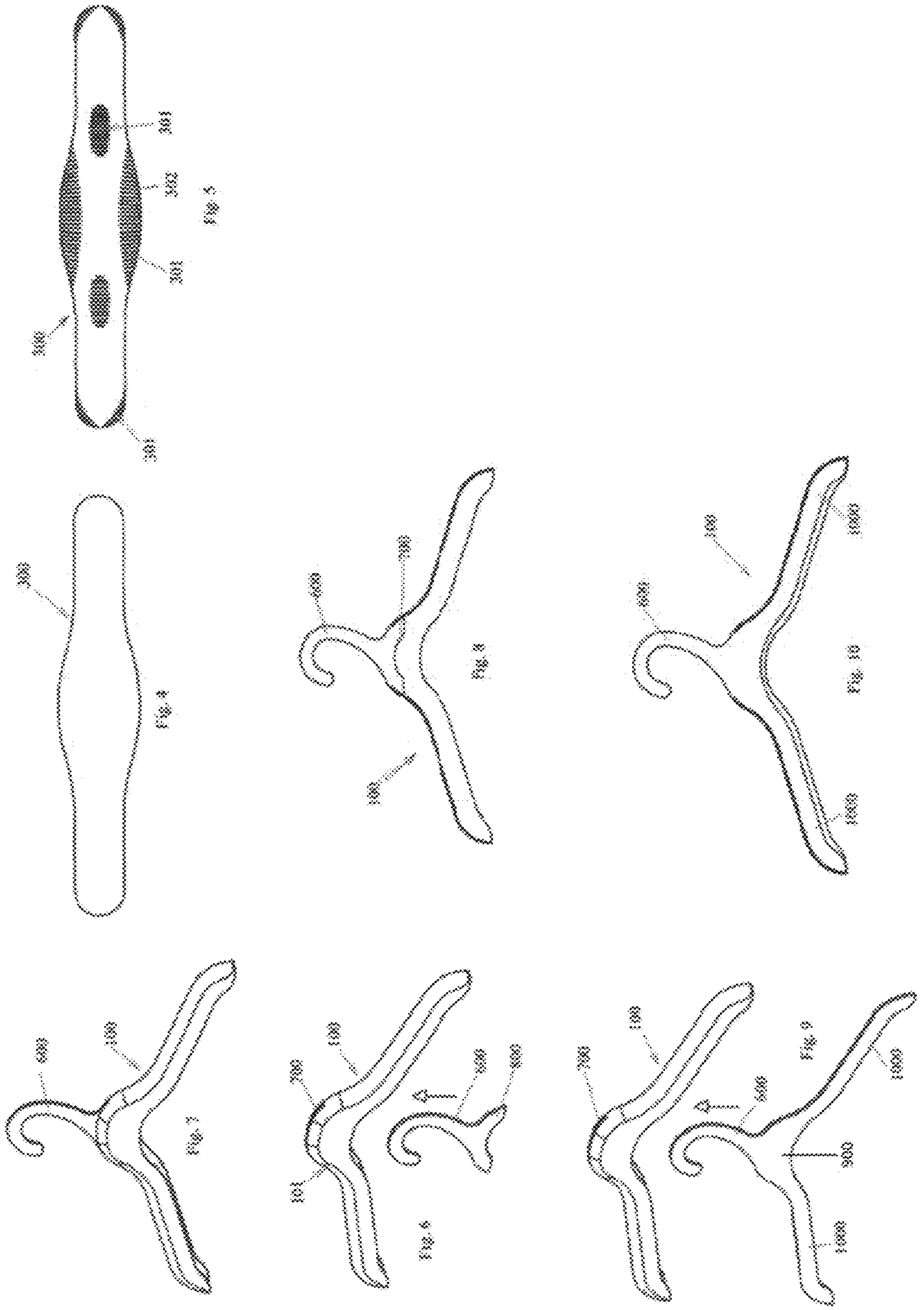
FIG. 4 shows the cut flat layer of paper material from which the hanger of FIG. 2 is obtained.
FIG. 6 shows an overall view of a hanger produced with the method according to the invention, which has a slit for inserting a hook made of paper material.
FIG. 7 shows an overall view of said hanger in which said hook has been inserted.
FIG. 8 shows a longitudinal section view of the hanger shown in FIG. 7.
FIG. 9 shows an overall view of a hanger produced with the method according to the invention, which has a slit for inserting an integral hook whose shank has two reinforcing arms.
FIG. 10 shows a longitudinal section view of the hanger shown in FIG. 7, with assembled an integral hook whose shank has two reinforcing arms.
Figure 11:
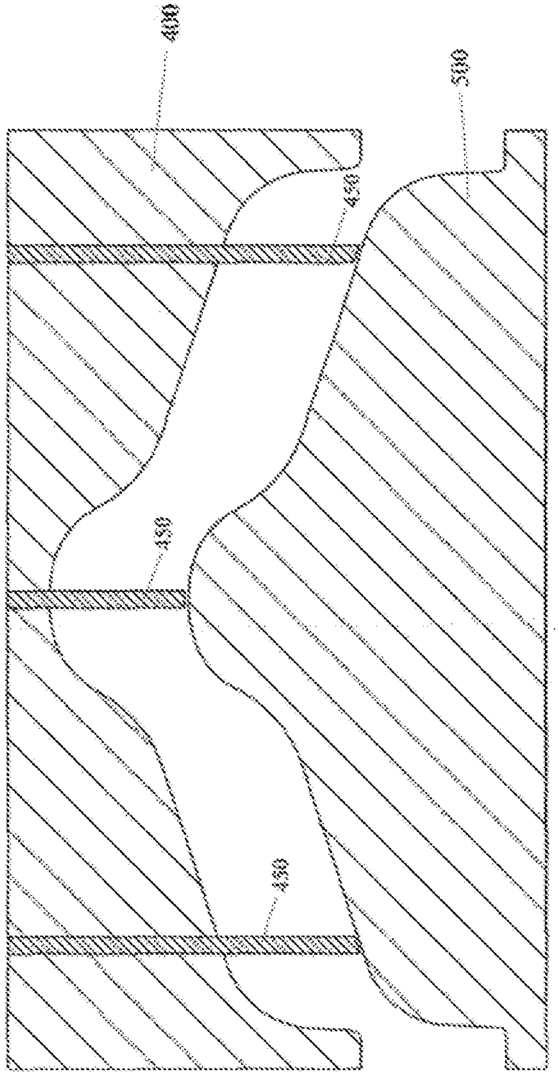
FIG. 11 illustrates a longitudinal section view of the assembly of mould, counter-mould and catch for withholding the flat layer from which the hanger will be obtained.

As can be seen in FIG. 6, once the hanger 100 is obtained by means of the process according to the invention, provided with at least one concave area 101, it will be necessary to envisage the presence of a hook 600. Advantageously, said hook will also be made of paper material in the desired shape, but in any case with a flat structure, so that it can be inserted into a suitable slit 700 provided at the top of the hanger so as to obtain the structure illustrated in FIGS. 7 and 8. The hook 600 can have a shank 800, with a longitudinal dimension larger than that of the slit 700 and with a conformation corresponding to the internal surface of said top, so as to be positioned exactly and stably at the top of the hanger to perform its function.

Alternatively, the hook 600 has a shank 900 provided with two arms 1000 and with a shape corresponding to that of the hanger 100 (FIGS. 9 and 10) so as to ensure, in addition to stabilising the hook 600 in the desired position, also the overall strengthening of the entire hanger.

As can be seen in FIGS. 15-18, it is possible to use a hanger 100 with at least one concave area 101 obtained with the method and/or by means of the system described above, even with a traditional hook. In fact, as can be seen in said figures, the hook 850, advantageously made of metal material, with methods known per se, has a straight segment 950, intended to rise from the top of the hanger 100 and which then continues with a curved portion 1050. As can be seen in particular in FIG. 18, the straight segment 950 ends at the bottom with a threaded portion 1150 which can be inserted into a through hole 1250 made at the top of the hanger.

Figure 17:
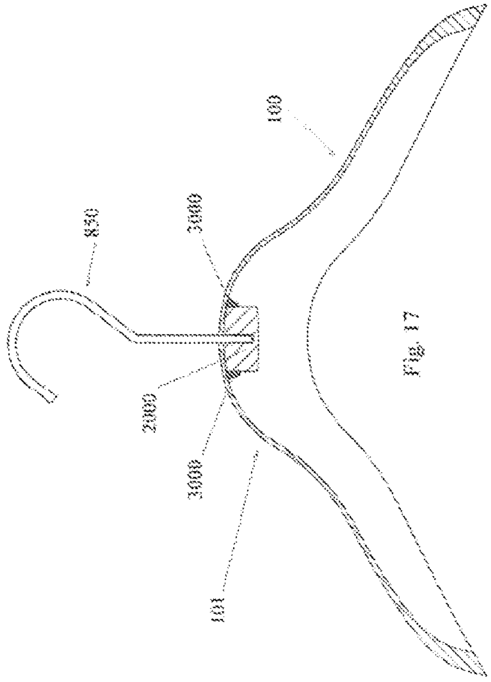

As can be seen in particular in FIG. 17, at the internal portion and not visible from the outside of said top, an element 2000 is placed, which is substantially cylindrical in shape, with a threaded hole 2001, in which said threaded portion 1150 can engage. The element 2000 will be placed between two projections 3000 present at the internal portion of the top of the concave area 101 of the hanger 100. Therefore, it is evident that, once the hook 850 has been adequately screwed into the hole 2001 of the element 2000, the mutual engagement between said hook 850 and said element 2000 and therefore with the hanger 100 is generated.

Advantageously, the element 2000 will be made of compostable material, precisely in order to be recycled in the same way as the hanger 100. Vice versa, when the user wants to dispose of the hanger as it is irreparably damaged or in any case when he no longer wishes to use it, it is evident that it will be sufficient to unscrew the hook 850 from the element 2000, so that said hook 850 can be disposed of correctly in the metal waste.

From what has been said so far, it can be understood that the method, the object and the system described above achieve all the intended objects.

More precisely, the object of proposing an alternative method for producing hangers of the ecological and biodegradable type with respect to the methods which provide the use of cellulose pulp has been achieved.

Furthermore, the object of proposing a method for producing hangers which allows the realization of ecological and biodegradable products with costs that are entirely equivalent to the costs of the same product made of plastics has been achieved. The object of proposing a method for producing ecological and biodegradable hangers has also been achieved which provide implementation times for realizing products that are completely comparable to the methods used for producing the same products in plastic material.

The invention claimed is:

1. METHOD FOR PRODUCING HANGERS FOR CLOTHING SUPPORT STARTING FROM A FLAT LAYER OF PAPER MATERIAL, comprising:

a) wetting said flat layer of paper material so as to increase the humidity percentage with respect to the standard humidity percentage that such flat layer of paper material presents at room temperature;

b) leaving said flat layer of paper material to rest for a predetermined period of time so that said humidity percentage is uniformly distributed throughout the entire thickness of said flat layer of paper material;

c) cutting said flat layer of paper material so as to define an appropriate shape of a hanger;

d) carrying out a knurling operation on at least one portion of said cut flat layer of paper material in which at least one concave area is formed;

e) carrying out the forming of said cut flat layer of paper material by means of the introduction of said cut flat layer of paper material between a mould and a counter-mould and subsequently through pressing to form the hanger; and f) carrying out a stabilisation operation of said hanger, reducing the humidity percentage thereof.

2. The method according to claim 1, wherein the cut flat layer of paper material, during the forming step, is withheld by at least one catch integral with the mould or with the counter-mould, so that it adheres firmly to the opposite surface of the opposing counter-mould or mould.

3. The method according to claim 1, wherein between said cutting step c) and said knurling step d) there is a rolling step c2) for the opening of the fibres of said cut flat layer of paper material.

4. The method according to claim 1, wherein said humidity percentage to which said flat layer of paper material is brought through said step a) and said step b) is comprised between 10% and 30%.

5. The method according to claim 1, wherein said wetting step a) provides with applying onto at least one surface of said flat layer of paper material a substance comprising water in the vaporized form.

6. The method according to claim 1, wherein said wetting step a) provides with applying onto at least one surface of said flat layer of paper material a substance comprising water through rolling.

7. The method according to claim 1, wherein said resting step b) provides with leaving said layer of paper material to rest at room temperature for a period comprised between 12 hours and 36 hours.

8. The method according to claim 1, wherein said knurling step d) provides with making said at least one portion of said cut flat layer of paper material pass between two toothed rollers.

9. The method according to claim 8, wherein said knurling step d) provides with making incisions at substantially parallel and not intersecting lines in the substantially orthogonal direction to the direction of the fold to be carried out.

10. The method according to claim 1, wherein said forming step e) is hot forming, said mould and said counter-mould having a temperature comprised between 60° C. and 120° C.

11. The method according to claim 1, wherein said stabilisation step f) provides with introducing said hanger into a tunnel in which cold air circulates and with a humidity level less than 13%.

12. The method according to claim 1, wherein said flat layer of paper material is a flat layer of fibre cardboard.

13. SYSTEM FOR PRODUCING A HANGER FOR CLOTHING SUPPORT STARTING FROM A FLAT LAYER OF PAPER MATERIAL, wherein it comprises in sequence:

a station for wetting said flat layer of paper material so as to carry out step a) of the method according to claim 1;

a rest station for resting said flat layer of paper material;

a cutting station provided with cutting matrices configured to carry out step c) of said method;

a knurling station provided with at least two toothed rollers configured to carry out step d) of said method;

a forming press provided with a mould and a counter-mould, said press being configured to carry out step e) of said method to form the hanger;

a stabilisation station configured to reduce the humidity percentage of said hanger following the forming operation.

14. The method according to claim 1, wherein said wetting step a) is performed before said cutting step c).

* * * * *